3,253,932
MOLD RELEASE AGENT
Roy A. White, Somers, and Rudolph D. Deanin, West Hartford, Conn., assignors to Ethyl Corporation, New York, N.Y., a corporation of Virginia
No Drawing. Filed Mar. 25, 1963, Ser. No. 267,832
20 Claims. (Cl. 106—38.22)

This invention relates to new compositions of matter which are particularly useful as mold release agents or lubricants in molding prosesses. This invention further relates to the use of these compositions as mold release agents.

In the past many of the techniques of molding particular polymers and plastics has remained an art. Skillful molders developed their own particular techniques and tricks to increase the moldability of their particular product. One development in this area has been the application and study of efficient lubricants as integral parts of molding powders or in the application of the lubricants to the molding surfaces by themselves. Because of high molding pressures the molded part is forced against the mold surfaces under extreme pressures. In many instances the particular substances being molded do not contrast in the mold and a means must be provided for aiding the release of the piece from the mold surface. Various lubricants have been devised to facilitate the removal of the molded object. The lubricants generally have included mineral waxes, vegetable waxes, fatty acids and metallic soaps. However, none of these individual lubricants or mold release agents have been found effective in all phases of molding. For example, some lubricants are semi-compatible with the particular cured resins and sweat out or bloom if used in large amounts. Other lubricants which are incompatible tend to form a lamination on the surface of the molded object. Still other lubricants create a surface on the molded object which prevents printing, stenciling or painting. Lubricant polymers such as polytetrafluoroethylene are difficult to formulate and use because the polymeric product is practically resistant to all solvents. Thus a means for applying polytetrafluoroethylene to the surface of molding plates has been extremely difficult to find.

It is therefore an object of the present invention to provide new compositions of matter which overcome many of the undesirable qualities of prior art mold lubricants. It is still a further object to provide new compositions of matter which are valuable as mold release agents and which are applicable to a wide variety of molding operations. It is still a further object of the present invention to provide a process for applying the new compositons as external lubricants to the particular molding apparatus. Other objects will be apparent from the description of the invention given below.

The above and other objects are fulfilled by the provision of a composition adapted for use as a mold release agent consisting essentially of a polymer of an alpha olefinic hydrocarbon said polymer having a molecular weight of at least 1000 and having in the monomer molecular from about 16 to about 34 carbon atoms and an inert organic diluent having a boiling point of from about —80° C. to about 200° C. and a melting point of below about 25° C. The polymer is associated with the inert organic diluent in a concentration of from about 0.01 to about 10 weight percent and the diluent is maintained in the liquid state of aggregation.

It is important that the physical properties of the inert organic diluent be such that when applied to a hot molding surface of a molding machine the diluent is dissipated or rapidly evaporated by heat of said plate. Thus when a polymer as described hereinabove is suspended or associated with the diluent and the mixture is applied to the hot molding surface of a molding machine, the diluent is dissipated by the heat leaving a continuous film of polymer on the molding surface of said plate. The type of diluent preferably employed would generally depend on the boiling point of the diluent, the type of polymer being molded, the molding temperature, and the molding technique employed. One could thus conceivably employ a diluent with a boiling point of over 200° C. if the molding temperature was such that the diluent would be dissipated. Likewise, one could also employ a diluent with a boiling point of below —80° C. if the diluent is capable of being maintained in the liquid state of aggregation. The diluent should have a melting point of below about 25° C. since it is necessary to mix the polymer, as described hereinabove, with the diluent. It is preferable to employ a diluent having a boiling point of from about —30° C. up to about 150° C. and a melting point of below about 25° C. which is capable of being maintained in the liquid state of aggregation since a diluent having properties within these ranges is easy to employ and gives excellent results.

Typical examples of groups of diluents which may be employed are aliphatic, cycloaliphatic, aromatic hydrocarbons or halogenated derivatives of these. Hydrocarbon mixtures and ethers including alkyl ethers, cyclic ethers, glycol ethers may be employed. Ketones and commercial "Freon" type propellants can also be employed. A few examples of the preferred solvents are toluene, benzene, 1,1,1-trichloroethane, dichlorodifluoromethane and the like.

The polymer of the alpha olefinic hydrocarbon is further characterized by generally having a molecular weight of from about 500 up to about 50,000. It is preferable that the polymer have a molecular weight of from about 1000 up to about 45,000. It is most particularly preferred that the polymer have a molecular weight of from about 2000 up to about 20,000. Within these molecular weight ranges, excellent mold release properties are experienced, coupled with easy application of the polymer to molding surface of the molding apparatus.

These molecular weight ranges may also be expressed in terms of inherent viscosity. The inherent viscosity of the polymer will generally range from about 0.1 up to about 5.0. The preferred inherent viscosity ranges from about 0.5 up to about 2.5.

The polymer can either be dissolved in the diluent or can be suspended therein. It is preferable to dissolve the polymer in diluent since solution is easier and good results are obtained.

The concentration of polymer in diluent generally ranges from about 0.001 weight percent up to about 25 weight percent based on the diluent. It is preferred that the concentration of polymer in the diluent be from about 0.01 weight percent up to about 10 weight percent since excellent mold release results are experienced within this range. It is particularly preferred that the concentration of polymer be from about 0.1 weight percent up to about 5 weight percent. When the preferred concentrations of polymer are employed, excellent lubrication of the molding surfaces of the molding machine is achieved with essentially no clouding and the surface of the molded object is not greasy or laminated.

The polymeric olefin is further defined as being derived from an olefinic monomer having from about 16 up to about 34 carbon atoms. The vinyl or alpha olefinic monomer generally has the formula $$R-CH=CH_2$$

wherein R is an alkyl group having from about 14 up to about 32 carbon atoms. The monomer may either be in an essentially pure state or a mixture of monomers. In some instances olefins having beta branches may be present in which instance the number of carbon atoms in the monomer will remain the same, i.e., 16–34. It is preferable that the terminal monoolefinic hydrocarbon have from about 18 to about 32 carbon atoms since polymers derived therefrom when admixed with a diluent exhibit excellent lubrication properties. It is most particularly preferred that the olefin monomer be either octadecene-1 or a mixture of alpha olefins having from 18 to about 32 carbon atoms. These particularly preferred olefins are economical, easily obtained and give excellent results as a mold lubricant.

Typical examples of the alpha olefins employed in the present invention are hexadecence-1, heptadecene-1, octadecene-1, nonadecene-1, eicoscene-1, heneicoscene-1, docecene-1, tricocene-1, tetracocene-1, pentacocence-1, hexacocene-1, heptacocene-1, octacocene-1, nonacocene-1, triacontacene-1, hentriacontacene-1, dotriacontacene-1, tritriacontacene-1, tetratriacontacene-1, 2-ethyl-hexadecene-1, 2-ethyl-octadecene-1, 2-methyl-octadecene-1, 2-ethyl-dococene-1, 2-butyl-octadecene-1, 2-ethyl-tricontacene-1 and the like.

The term mixtures as used hereinabove may be defined as physical mixtures of two or more terminal monoolefinic hydrocarbons having from about 16 up to about 34 carbon atoms so long as at least two of the olefins differ from each other in carbon content by at least one and preferably two carbon atoms. Typical examples of these olefin mixtures are: two component systems such as hexadecene-1 and octadecene-1; three component systems such as octadecene-1, eicoscene-1, and dococene-1; four component systems such as octadecene-1, dococene-1, tetraocene-1, and hexacocene-1. Other systems comprising a mixture of 5 through 18 different olefins including beta branched olefins are within the ambit of this invention.

The preferred mixture of olefins having a components thereof is the mixture comprising olefins spanning the range of from 18 carbon atoms up to 32 carbon atoms, i.e., octadecene-1, nonadecene-1, eicoscene-1, heneicoscene-1, dococene-1, tricocene-1, tetracocene-1, pentacocene-1, hexacocene-1, heptacocene-1, octacocene-1, nonacocene-1, triacontacene-1, hentriacontacene-1, and dotriacontacene-1. This mixture of alpha olefins may vary over a wide latitude. For example the olefins with the even number of carbon atoms are generally much in predominance comprising from about 90 to about 100 percent of the mixture. However, in many instances equal weight percentages of each of the olefins may be present including beta branched olefins.

The most particularly preferred mixture of olefins are those in which each have an even number of carbon atoms, the individual alpha olefinic hydrocarbons differ in carbon content predominantly in increments of two. Thus, the particularly preferred mixture of terminal monoolefinic hydrocarbons comprises octadecene-1, eicoscene-1, dococene-1, tetracocene-1, hexacocene-1, octacocene-1, triacontacene-1, and dotriacontacene-1. The percentages of the respective olefins present in the preferred mixture are subject to wide variation. Generally, the octadecene is the predominate olefins present and constitutes from about 20 percent to about 80 percent of the mixture with the remainder being the other olefins in various amounts.

The olefins described hereinabove may be obtained by any general prior art chain growth process. They may also be obtained through modern refinery techniques. One such chain growth technique is set forth in U.S. Patent 2,699,457 to Ziegler issued January 11, 1955.

The alpha olefins are generally polymerized by the use of a catalyst system consisting of an alkyl aluminum compound and a salt of a refractory metal. An example of this catalyst is triethyl aluminum and titanium tetrachloride. Generally, the temperature may vary from about 0°–150° C. and at a pressure of from about atmospheric up to about 100 atmospheres. One general technique which may be employed is set forth by C. S. Marvel in the Journal of Polymer Science No. 152, pp. 335–353 (1961). The Marvel article described polymerizing octadecene-1 employing as the catalyst triisobutyl aluminum and titanium tetachloride in a normal heptane solution. The ratio of triisobutyl aluminum to titanium ranged from about 1:1 down to about 0.8:3. The percent conversion of polyoctadecene ranged up to 100 percent.

For best results, when employing the novel compositions of this invention as a mold release agent, it is necessary that essentially all of the catalyst be removed from the polymer after the polymerization process. In other words, the polymeric alpha olefin must be substantially free from any catalyst or catalyst residue. If the catalyst remains in the polymer, the efficiency of the polymer and diluent as a mold release agent is sharply diminished. For example, the presence of the catalyst in some instances can cause a polymer lamination, i.e., mold release agent laminated on the molded item, or the catalyst can cause discoloration, cloudiness, sticking or degradation of the plastic being molded.

The removal of the catalyst may generally be accomplished by washing the alpha olefinic polymer with an alcohol such as methanol. Prior art techniques of catalyst removal may also be employed such as two phase solvent systems found in U.S. Patent 2,886,561 to W. B. Reynolds et al. issued May 12, 1959.

Another embodiment of the present invention is a composition adapted for use as a mold release agent consisting essentially of (1) a polymer of an alpha olefinic hydrocarbon said polymer having a molecular weight of at least about 1000 and having in the monomer molecule from about 16 to about 34 carbon atoms; (2) an organic diluent having a boiling point of from about −80° C. to about 200° C. and a melting point of below about 25° C.; (3) water; and (4) a surfactant. The concentration of polymer is generally from about 0.01 weight percent up to about 20 weight percent based on the total weight of emulsion. However, concentrations of polymer ranging up to about 50 weight percent may be employed in many instances. The ratio of solvent to water from about 0.5:1 up to about 4:1 and preferably from about 0.8:1 up to about 2:1. The surfactant is generally employed in a concentration of about 0.1% up to about 10% based on the weight of the polymer.

The surfactant may be further defined as a surface active agent which is a compound that reduces the surface tension when dissolved in water or water solutions. In other words, the surfactant affects the interfacial tension between two liquids. Typical classes of these surfactants include anionic emulsifiers such as soaps and organic sodium sulfonate; nonionic emulsifiers such as polyethers; and cationic emulsifiers such as quaternary ammonium compounds. Hydrophilic colloids may also be employed, typical examples of which are carboxymethyl cellulose, hydroxyethyl cellulose, methyl cellulose, polyvinyl alcohol, proteins, polyvinyl pyrrolidone and the like.

A further embodiment of the present invention is the process of lubricating the molding surfaces of molding machines or apparatus comprising the steps of: (1) coating said surfaces with a composition consisting essentially of a polymer of an alpha olefinic hydrocarbon, said polymer being characterized by having a molecular weight of at least about 1000 and having in the monomer molecule from about 16 to about 34 carbon atoms and an inert organic diluent having a boiling point of from about −80° C. to about 200° C. and a melting point of below about 25° C.; said polymer being associated with said diluent in a concentration of about 0.01 to about 10 weight percent; (2) thereafter molding the plastic in the molding machines; and (3) recovering the molded product.

A still further embodiment of the present invention is the process of lubricating the molding surfaces of molding machines or apparatus which comprises the steps of (1) coating said surfaces with a composition consisting essentially of a polymer of an alpha olefinic hydrocarbon wherein the polymer is characterized by having a molecular weight of at least about 1000 and having in the monomer molecule from about 16 to about 34 carbon atoms; an inert organic diluent; water; and a surfactant and thereafter (2) molding the plastic in the molding machine, and (3) recovering the molded product.

Still another feature of this invention is the process of lubricating the molding surfaces of molding machines or apparatus which comprises the steps of (1) coating said surfaces with a composition consisting essentially of a polymer of an alpha olefinic hydrocarbon wherein the polymer is characterized by having a molecular weight of at least about 1000 and having in the monomer molecule from about 16 to about 34 carbon atoms, (2) molding the plastic in the molding machines, and (3) recovering the molded product.

The processes of applying the mold release agent to the molding surfaces of a machine is applicable to techniques such as calendering, compression molding, injection molding, jet molding and the like.

The advantages of the compositions and processes of this invention are many in number. Unlike the prior art external lubricants there is no tackiness or caking in the cylinder of an injection molding machine when the lubricants of this invention are employed. No cloudiness or bubbling is experienced and no lamination with the molded product is observed. Furthermore, products which have been molded in the presence of the external lubricants of this invention possess in general a surface which is not impaired to painting or printing or even labeling with adhesive tape. Over and above the enumerated advantages is the fact that the lubricants of this invention are extremely economical, a definite advantage over prior art lubricants such as silicones.

The compositions of this invention and the processes by which they are applied will be better understood by the following examples in which all parts are by weight unless otherwise specified.

EXAMPLE I

*Preparation of polymer.*—Essentially pure octadecene-1 (20 parts) was added to a reactor equipped with a high speed stirrer and containing 1.3 parts of n-heptane. 3.5 parts per hundred of triisobutyl aluminum and 1.1 parts per hundred of titanium tetrachloride were mixed and added to the reaction mixture. The reaction mixture was stirred for 48 hours at room temperature after which the resultant polymer, polyoctadecene, was washed with methyl alcohol. The resultant polyoctadecene was obtained in about 82.6 percent yield.

*Formulation of the solution of polyoctadecene.*—8.7 parts of toluene was warmed to a temperature of about 50° C. To the heated toluene was added 1.74 parts of polyoctadecene. The mixture was stirred until the polyoctadecene dissolved in the toluene.

EXAMPLE II

*Preparation of polymer.*—Ten (10) parts of a mixture of alpha olefins having the composition comprising about 50% octadecene-1
20% eicoscene-1
10% dococene-1
7% tetracocene-1
5% hexacocene-1
3% octacocene-1
3% triacontacene-1
2% dotriacontacene-1 was added to a reaction vessel equipped with a high speed stirrer and containing 25.4 parts of heptane. To this mixture was added 0.18 part by volume of triethyl aluminum and 0.07 part by volume of titanium tetrachloride. The mixture was maintained at a temperature of 40–45° C. at atmospheric pressure with stirring for 68 hours. After this reaction period the polymeric product was washed with methanol. The polymer of the olefinic mixture of $C_{18}$–$C_{32}$ was obtained in an 82 percent yield and had an inherent viscosity of 1.2.

*Formulation of the polymeric mixture of the olefinic mixture.*—Eighty-seven (87) parts of toluene was heated in a reaction vessel to about 50° C. To this warm toluene was added 16 parts of the polymeric olefinic mixture. The solution was stirred until the polymeric mixture was dissolved therein.

Other alpha olefins and mixtures of alpha olefins which may be polymerized and compounded, with equally good results, in accordance with Examples I and II are nonadecene-1, heneicoscene-1, triacocene-1, pentacocene-1, heptacocene-1, nonacocene-1, hentriacontacene-1 and the like.

Other solvents which may be employed in compounding the resultant polymer are dichlorodifluoromethane, tetrafluoromethane, trichlorotrifluoroethane, monobromotrifluoromethane, diisopropylketone, trichlorobenzene, diethylether, benzene and the like.

EXAMPLE III

*Application of the formulations of Examples I and II.*—Chrome plated steel molding plates were scratched with emery paper to resemble old scoured molding plates. These plates were thereafter cleaned with methyl ethyl ketone. After drying the plates, a 2 percent solution of polyoctadecene-1 as prepared in Example I was applied to the surface of the plates. One half gram of nylon 66 was preheated between the plates in an 8″ Preco press for two minutes. The nylon was then molded for one minute at 550° F. at 40,000 pounds of pressure and thereafter cooled. Another set of molding plates were treated with the solution as prepared in Example II and the molding of nylon 66 was repeated. The results are set forth in Table I. Each of the moldings were rated according to the ease of separating the plates, that is the difficulty of separating the plates which are pressing the resin. The moldings were also rated as to the ease of removing the molded film from the plates without tearing or ripping. The procedure of molding was repeated a second time except that the plates were not subjected to a second lubricant treatment. The results tabulated below for the second molding are rated in the same fashion as in the first molding.

*Table I*

| Mold Release Agent of This Invention | First Molding | | Second Molding | |
|---|---|---|---|---|
| | Ease of Separating Plates | Ease of Removing Molded Film | Ease of Separating Plates | Ease of Removing Molded Film |
| Crude $C_{18}$–$C_{32}$ Polyalpha Olefin/Toluene. | Good | Fair-Good | Fair-Good | Fair-Good. |
| Pure Polyoctadecene/Toluene | do | do | Fair-Poor | Fair-Poor. |

Equally good results are obtained when polyhexadecene, polyheptadecene, polydococene and polydotriacontacene are employed in conjunction with solvents such as benzene, xylene, methyl cyclohexane, ethylene dichloride, trichloromonofluoromethane, octafluorocyclobutane and bromobenzene.

COMPARATIVE EXAMPLE A

Nine commercially available mold release agents were tested in the same manner as the two lubricants. In addition to this, a molding was made in which no lubricant was employed. The ratings of the commercially available mold release agents were made in exactly the same manner as set forth in Table I. Likewise, the product molded in each instance was again nylon 66. The results of these nine runs are set forth in Table II.

The data of Table III demonstrate that each of the mold release agents of this invention give excellent results both on glass and aluminum.

It should be noted that similar excellent results are experienced when each polymer of hexacocene, octacocene, triacontacene and dotriacontacene are employed in conjunction with a solvent such as methyl ethyl ketone, chloroacetone, heptene, benzene, 1,4-di-t-butyl benzene, trichloroethylene, and perchlorethylene.

COMPARATIVE EXAMPLE B

Example IV was repeated with the exception of the mold release agent employed. Three runs were made on each glass and aluminum employing a commercial silicone product, a commercially available polyethylene glycol and no mold release agent. The results obtained are shown in the data listed in Table IV.

Table II

| Mold Release Agent Not of This Invention | Description | First Molding | | Second Molding | |
|---|---|---|---|---|---|
| | | Ease of Separating Plates | Ease of Removing Molded Film | Ease of Separating Plates | Ease of Removing Molded Film |
| Slide Paintable Silicone Mold Release. | Silicone Aerosol | Fair | Good | Fair | Fair-Good. |
| Silicone Spray | do | Fair-Good | do | Fair-Poor | Fair. |
| Releasea Gen | A Lecithin Solution | do | Fair-Good [1] | Fair | Fair-Poor. |
| S-122 Fluorocarbon Aerosol | Vydax (a fluorocarbon telomer) Aerosol. | Good | Fair | Good | Good. |
| Acrawax C | Synthetic Ester Amide | Fair | Fair-Good | Very Poor | Poor. |
| Zinc Stearate | Powder | Poor | Fair | do | Very Poor. |
| Mold-Ease PCR | 5.9% Aqueous Polyethylene Glycol. | Good | Fair-Poor | Fair | Do. |
| SF-96 Silicone Oil 300 | Dimethy Polysiloxane Silicone Oil. | Poor | Poor | | |
| Paraffin Wax | | Very Poor | Impossible | | |
| None | | do | do | | |

[1] Turned black, strong fishy odor.

It is thus seen from Example I and Comparative Example A that the lubricants of the present invention are comparable to many commercially available agents and in many instances are superior. It should be further noted that in the case of paraffin wax that the molded nylon could not be separated from the plate.

The compositions of this invention are further tested in the application of molding of polyesters.

EXAMPLE IV

A polyester composition was prepared which comprised mixing 100 parts of Naugatuck Vibrin 115–A polyester (an unsaturated polyester mixed with a styrene monomer), 0.5 part of a 6 percent solution of cobalt naphthenate and 1 part of methyl ethyl ketone peroxide (60 percent solution). The polyoctadecene solution and the crude polymer solutions of Examples I and II were each applied individually to glass molding plates and aluminum molding plates. The polyester previously formulated was applied to each of the plates and cured for three days at room temperature and thereafter removed from the molds. Each of the mold release agents were rated according to ease of removing the polyester casting from the mold. The results are set forth in Table III.

Table III

| Mold Release Agent of This Invention | Ability to Release Polyester from Mold | |
|---|---|---|
| | Glass | Aluminum |
| Pure Polyoctadecene/Toluene | Excellent | Excellent. |
| Crude $C_{18}$-$C_{32}$ Poly-alpha-olefin/Toluene | do | Do. |

Table IV

| Mold Release Agent Not of This Invention | Ability to Release Polyester from Mold | |
|---|---|---|
| | Glass | Aluminum |
| Silicone Spray | Very Poor | Very Poor. |
| 5.9% Aqueous Polyethylene Glycol | | Do. |
| None | Very Poor | Do. |

It is thus seen from Example IV and Comparative Example B, Tables III and IV that the mold release compositions of the present invention are superior to either a commercial silicone mold release agent or a commercially available polyethylene glycol solution.

Tests were also carried out on epoxy resins which are notorious for their adhesiveness during molding, casting, and laminating. Large amounts of mold release agents are generally required in molding epoxy resins.

EXAMPLE V

Two percent solutions of each polyoctadecene and a mixture of polyolefins having 18 to 32 carbon atoms in a toluene solution was prepared in accordance with Examples I and II. Each of these solutions were applied to a clean glass surface. A standard epoxy resin formulation was prepared by mixing 100 parts of Shell Epon 828 (which is understood to be a condensation product of epichlorohydrin and p,p'-isopropylidenediphenol), 9 parts of diethylene triamine and 10 parts of an epoxy modifier (Mod-Epox). The epoxy resin formulation was applied to the treated glass surfaces and the castings were cured for 18 hours at room temperature and thereafter at 140° F. for 2 hours. Again the respective mold release agents were rated according to the ease of release from the glass surface. The results of the two tests are demonstrated in Table V below.

Table V

| Mold release agent of this invention: | Ability to release epoxy from glass |
|---|---|
| Pure polyoctadecene | Excellent. |
| Crude $C_{18}$–$C_{32}$ poly-alpha-olefin | Excellent. |

Similar excellent results are experienced when the mixtures of polymeric olefins are employed such as hexadecene and octadecene; octadecene, eicoscene and docoscene; and octadecene, docoscene, tetracocene and hexacocene are employed with solvents such as octafluorocyclobutane, cycloheptane, carbon tetrachloride, and p-cymene.

Comparative runs were made employing a commercially available silicone oil, a commercially available silicone spray, paraffin and no release agent at all. In each of these instances the ease of release or removal of the casting from the mold was again rated and the results tabulated in Table VI. None of the commercial products tested possessed the mold release properties of the compositions of the present invention.

Table VI

| Mold release agent not of this invention: | Ability to release epoxy from glass |
|---|---|
| Silicone oil | Very poor. |
| Silicone spray (aerosol) | Very poor. |
| Paraffin wax | Very poor. |
| None | Very poor. |

EXAMPLE VI

Thermosetting polyurethanes are also very adhesive during polymerization and require mold release agents. A 2 percent solution of pure polyoctadecene in toluene was made up as in Example I. Scratched chrome steel molding plates were employed for the castings. To these clean scratched plates was added the polyoctadecene mold release solution. To the treated plates was added thermosetting polyurethane, Nopco Nopcofoam F–202. The polyurethane was cured on the steel plates for 17 hours at 140° F. The 2 percent solution of polyoctadecene provided good release of foam from the plate.

Three comparative runs were made employing as a mold release agent a fluorocarbon and a commercially available silicone spray. No mold release agent was applied to the third plate. The results of these comparative tests are set out in Table VII below.

Table VII

| Mold release agent not of this invention: | Ability to release foam from plate |
|---|---|
| Fluorocarbon aerosol | Very poor. |
| Silicone spray | Very poor. |
| None | Very poor. |

It is thus noted from the above example that the mold release agent of this invention, polyoctadecene, as compared to standard formulations have excellent mold release characteristics.

EXAMPLE VII

Pure polyoctadecene (1 part) produced in Example I was added to 70 parts of 1,1,1-trichloroethane and 70 parts of dichlorodifluoromethane. The mixture was stirred at about 0° C. to disperse the polyoctadecene. The mixture was then placed in a container equipped with a release valve.

EXAMPLE VIII

Tests were made employing flame retardant polystyrene as the resin. In the tests badly scratched, acid etched chrome plated steel molding plates were coated with 0.13 gram per sq. ft. of the mold release agent. The flame retardant polystyrene was applied to the steel plate, which was previously treated with the polyoctadecene of Example VII, and molded at 400° F. The polyoctadecene was rate as fair in release. The flame retardant polystyrene was clear.

Similar excellent results are obtained when the polymer is dissolved in a propellant in the absence of a diluent. Examples of propellants which give good results are dichlorodifluoromethane, fluorotrichloromethane and trifluorotrichloroethane.

Two other commercially available mold release agents were compared with the polyoctadecene of this invention. The results of the tests are indicated in Table VIII below.

Table VIII

| Mold release agent not of this invention: | Ability to release from mold |
|---|---|
| Fluorocarbon aerosol | Fair release (cloudy surface). |
| Silicone spray | Poor release. |
| None | Very poor release. |

Table VIII demonstrates the commercially available release agents tested above were definitely inferior to the product of this invention. Cloudy surfaces have always been a problem in polystyrene molding as well as lubrication. The styrene molded product obtained in Example VIII when the polyoctadecene release agent was employed was subjected to painting with an aerosol paint without further surface treatment. It was found that the polyoctadecene mold release agent did not impair the surface of the molded polystyrene product as far as the adherence of the paint was concerned.

EXAMPLE IX

A polyoctadecene-toluene solution is made up in the same manner as set forth in Example I. To this solution is added 25% by weight of water. The resultant mixture is agitated and 0.5 part of dioctyl sodium sulfosuccinate is added. Agitation is continued for a few minutes after the addition of the sodium salt.

The polyoctadecene mixture is applied to the molding surface of badly scoured chrome plated steel molding plates which are preheated. The solution evaporated leaving a coating of polyoctadecene on the surface of the plates. One-half gram of nylon 66 is placed on the plates and preheated for two minutes. The nylon is then molded for one minute at 550° F. at 40,000 pounds per square inch and thereafter cooled. The ease of separating the plates is rated as good.

Equally good results are experienced when other polymeric alpha olefins and mixtures of alpha olefins are compounded with an inert organic diluent and a surfactant and hydrophilic colloids such as diethyl sodium sulfosuccinate, sodium laurate, sodium myristate, potassium myristate, sodium palmitate, carboxymethyl cellulose, methyl cellulose and the like are employed.

EXAMPLE X

The mixture of polymeric alpha olefins of Example II is applied in the essentially pure state in the absence of a solvent to the hot surface of chrome plate steel molding plates. This is achieved by merely sprinkling the polymer powder on the plates. Nylon 66 is molded in the same manner as set forth in Example IX. The ability to release the molded nylon was rated as good.

It should also be noted that the products of this invention may be used in molding applications for plastics and resins other than those shown above with equally good results. Typical examples of other plastics when these mold release agents may be employed are polyvinylchloride, phenolic resins, urea-formaldehyde resins, melamine formaldehyde resins, cellulose esters, polycarbonates, acetals and polyolefins and the like.

Diluents which may be employed in conjunction with the polyoctadecene mold release agent of this invention are organic diluents having a boiling point of between about −80° C. up to about 200° C. These organic diluents are generally inert to the polymeric materials which have been dissolved therein. It is preferable that the organic diluents employed be hydrocarbon diluents having up to about 16 carbon atoms. The hydrocarbon diluents may be aliphatic, cycloaliphatic, aromatic or halogenated derivatives of these. It is most preferable to employ either aromatic or halogenated hydrocarbons since excellent results are experienced when these diluents are used. Typical examples of the diluents which may be employed in this invention are benzene, toluene, o-xylene, m-xylene, p-xylene, hemimellitene, psuedocumene, mesitylene, isodurene, ethyl benzene, 1,2-diethyl benzene, n-propyl benzene, cumene, n-butyl benzene, t-butyl benzene, p-cymene, allyl benzene, hexane, heptane, octane, nonane, decane, cyclohexane, cycloheptane, methyl cyclohexane, methyl cycloheptane, methyl chloride, carbon tetrachloride, ethyl chloride, methyene chloride, ethylene dichloride, chloroform, dichloroethylene, tetrachloroethane, pentachloroethane, hexachloroethane, trichlorethylene, perchlorethylene, propylene dichloride, 1,1,1 - trichloroethane, 1-chloropentane, 1-chlorobutane, bromobenzene, chlorobenzene, dibromobenzene, trichlorobenzene, p-chlorotoluene, o-chlorotoluene, hexene, heptene, octene, decene, alpha dichloroheptene, alpha dibromooctene and the like. Hydrocarbon mixtures may also be employed typical of which are the turpines, naphthas, gasoline, kerosene and the like. Ethers such as dialkylethers, cyclic ethers, glycol ethers and the like may be employed. Typical examples of these ethers are ethyl ether, isopropyl ether, n-butyl ether, diamyl ether, n-hexyl ether, ethylene glycol monomethyl ether, ethylene glycol mono-n-butyl ether, diethylene glycol monomethyl ether, diethylene glycol monoethyl ether, diethylene glycol monobutyl ether, ethylene glycol diethyl ether, ethylene glycol dimethyl ether, ethylene glycol dibutyl ether, 1,4-dioxane, 1,2-propylene oxide, dimethoxymethane, 2-methyl furan, tetrahydrofuran, dihydropyran, tetrahydropyran, 2,2'-dichloroethyl ether and the like. Ketones may also be employed in this invention typical of which are methyl isobutyl ketone, methyl ethyl ketone, methyl-n-propyl ketone, hexanone-2, hexanone-3, methyl-t-butyl ketone, di-n-propyl ketone, diisopropyl ketone, diisobutyl ketone, di-n-amyl ketone, chloroacetone, dichloroacetone, mesityl oxide, cyclohexanone, acetyl acetone and the like.

In many instances, it is extremely desirable to employ a commercial propellant as a diluent. Typical examples of these propellants are trichloromonofluoromethane, dichlorodifluoromethane, monochlorotrifluoromethane, monobromotrifluoromethane, tetrafluoromethane, monochlorodifluoromethane, dichlorotetrafluoromethane, octafluorocyclobutane, tetrachlorodifluoroethane, trichloromonofluoromethane, trichlorotrifluoroethane and the like.

It should also be noted that the polymers may be compounded with a propellant and another diluent. Typical examples of these combinations are: trichloromonofluoromethane and 1,1,1-trichloroethane, dichlorodifluoromethane and toluene; monochlorotrifluoromethane and hexane; monobromotrifluoromethane and cyclopentane; tetrafluoromethane and the diethyl ether of diethylene glycol and the like.

Typical examples of surfactants which may be employed in this invention can be found in Organic Chemistry, 3rd edition by Fieser and Fieser, Reinhold Publishing Company, pp. 410–415; Surface Active Agents by Schwartz and Perry, 1949, Interscience Publishers, Inc., New York; and Surface Active Agents by Anson et al., Annal of the New York Academy of Science, volume XLVI, Art 6, pp. 347–530, 1946. Typical of these surface active agents are the polyethylene oxide ether of lauryl alcohol, polyethylene oxide ether of 1,1,3,3-tetramethyl butyl phenol, dimethyl lauryl-benzyl ammonium chloride, the methosulphate of oleyl amide of diethyl ethylene diamine, cetyl pyridinium chloride, sodium sulphonate of heptadecyl benzimidazole, sodium sulphate of polyethylene oxide ether of 1,1,3,3-tetramethylbutylphenol, sodium sulphonate of polyethylene oxide ether of 1,1,3,3-tetramethylbutylphenol, sodium sulphate of 2-methyl-7-ethyl-undecanol-4, sodium sulphate of 3,9-diethyltridecanol-6, di-(2-ethylbutyl)sodium sulphosuccinate, sodium salt of octyl oleate, sodium salt of octyl isethionate, sodium salt of oleyl amide of N-methyl glycine, sodium salt of the lauric ester of sulpho-acetic acid, the condensation product of oleic acid and degraded protein, octyl benzene sodium sulphonate, diisopropyl naphthalene sodium sulphonate, sodium stearate, cetyl sodium sulphonate, sodium sulphate of lauryl alcohol, sodium sulphate of oleyl alcohol, carboxymethyl cellulose, methyl cellulose, hydroxyethyl cellulose, polyvinyl alcohol, polyvinyl pyrrolidone and the like.

The mold release agents of this invention lend themselves to a wide variety of general processing methods or molding techniques. One typical method in which these novel compositions are particularly useful is compression molding which is a non-continuous method for producing complex shapes by the influence of pressure upon a plastic compound confined in a heated mold. Injection molding and jet molding are also processes in which these novel compositions may be employed. Injection molding involves heating a plastic molding powder or granules in an enclosed cylinder to the proper temperature to which point a piston pushes the softened plastic through a nozzle along runners into a cool mold. These compositions may be employed both in the enclosed cylinder, the piston or ram and the cold mold. These novel compositions are also useful in extruders which is a process of forcing a heat softened plastic material through an orifice or dye to produce rods or tubes, etc. Other valuable processes such as film casting where the plastic is flowing out on moving belts or wheels are important uses. Calendering is another process in which these polyolefins may be employed as mold release agents or lubricants.

The polymers of this invention may also be employed as internal lubricants. Internal lubrication is, of course, achieved by mixing the lubricant material with the polymer to be processed. Accordingly, in some instances moderate amounts of the polymer lubricants employed in this invention can be used to increase melt fluidity of high molecular weight polymers to be processed. The requirement of a lubricant is that the lubricant must be compatible with the high molecular polymers. A prerequisite for increasing the melt fluidity is that the additive is not seriously harmed by room temperature properties or heat distortion temperature. In other instances where the lubricant is incompatible with the high molecular polymers to be processed, trace amounts of the lubricant can be employed to increase lubricity in the processing technique employed such as calendering or molding.

The amount of poly $C_{18}$–$C_{32}$ polymer employed will generally depend on the particular use. If the lubricant is compatible with the high molecular weight polymer amounts ranging from about 1 weight percent up to about 40 weight percent may be employed. However, if the lubricant is not compatible with the high molecular weight polymer then amounts ranging from about 0.01 up to about 5 weight percent will be employed.

Polyoctadecene produced as in Example I was milled with polypropylene to test the increase of the melt fluidity of the polymer at high temperatures. The plasticized polymer was also tested for low temperature properties and strength. The results are given in Example XI and Table IX.

EXAMPLE XI

Polypropylene (70 parts) was milled with 30 parts of polyoctadecene for 10 minutes at 335° F. This product was compared with pure polypropylene. The data comparing pure polypropylene and polypropylene containing 30 parts of polyoctadecene are set forth in the following table. The data shows that the melt index of the lubricated polypropylene was markedly increased. This polymer also had excellent low temperature properties.

TABLE IX
COMPARISON OF POLYPROPYLENE WITH PLASTICIZED PROPYLENE

| | Polyoctadecene | Melt Index Test | | | Tensile [1] Yield Strength, p.s.i. | Ultimate [2] Elongation, Percent | 50% [3] Brittle Temperature, °F. | Shatter [4] at −13° F. |
|---|---|---|---|---|---|---|---|---|
| | | Temperature, °F. | Pressure, p.s.i. | Gm./10 Min. | | | | |
| Propylene | 0 | 447 | 43.25 | 4.63 | 4,200 | 700 | 85 | Yes. |
| Plasticized Proylene | 30 | 447 | 43.25 | 50 | 3,100 | 300 | 65 | No. |

[1] ASTM D-638, Instron, 0.5"/Minutes Pull, 73° F., 50% R.H.
[2] Measure of Stress.
[3] ASTM D746-57T, 1/16" Thick Bars. Temperature at which 50% of the bar are brittle.
[4] 30-Mil sheet struck sharply by hand against edge of freezer.

Similar excellent results are obtained when a polymeric mixture of olefins containing from 16 to 32 carbon atoms are employed (the composition of Example II); eicoscene-1, dococene-1, tetracocene-1, hexacocene-1 and the like.

The polymers employed in this invention find additional uses as a lubricant for plastics such as nylon rollers, window tracks, sliding doors and the like.

Having thus described embodiments of the present invention it is not desired to be bound except as set forth in the following claims.

Having thus described embodiments of the present invention it is not desired to be bound except as set forth in the following claims:

We claim:

1. A composition adapted for use as a mold release agent consisting essentially of a polymer of an alpha olefinic hydrocarbon said polymer having a molecular weight in the range of from about 1000 up to about 45,000 and having in the monomer molecule from about 16 to about 34 carbon atoms and an inert organic diluent having a boiling point of from about −80° C. to about 200° C. and a melting point of below about 25° C., said polymer being associated with said diluent in a concentration of about 0.01 to about 10 weight percent, the balance of said composition being diluent, said diluent being maintained in the liquid state of aggregation.

2. The composition of claim 1 wherein said diluent is further characterized in that it is a halogenated hydrocarbon solvent.

3. The composition of claim 1 wherein said diluent is 1,1,1-trichloroethane.

4. The composition of claim 1 wherein said diluent is further characterized in that it is an aromatic hydrocarbon solvent.

5. The composition of claim 1 wherein said diluent is toluene.

6. The composition of claim 1 wherein said olefinic hydrocarbon has from about 18 up to about 32 carbon atoms in the monomer molecule.

7. The composition of claim 1 wherein said olefinic hydrocarbon has about 18 carbon atoms in the monomer molecule.

8. The composition of claim 1 wherein said olefinic hydrocarbon is a mixture of olefins each having between about 18 up to about 32 carbon atoms in the monomer molecule.

9. A composition adapted for use as a mold release agent consisting essentially of polyoctadecene and 1,1,1-trichloroethane said polyoctadecene being associated with said 1,1,1-trichloroethane in a concentration of about 0.01 weight percent up to about 10 weight percent based on the 1,1,1-trichloroethane.

10. A composition adapted for use as a mold release agent consisting essentially of polyoctadecene and toluene, said polyoctadecene being associated with said toluene in a concentration of about 0.01 weight percent up to about 10 weight percent based on the toluene.

11. A composition adapted for use as a mold release agent consisting essentially of a polymer of a mixture of alpha olefinic hydrocarbons each having in the monomer molecule from about 18 up to about 32 carbon atoms and toluene, said polymer being associated with said toluene in a concentration of about 0.01 weight percent up to about 10 weight percent based on the toluene.

12. A process of lubricating the molding surfaces of molding machines comprising coating said surfaces with the composition of claim 1.

13. A process of lubricating the molding surfaces of molding machines comprising coating said surfaces with the composition of claim 9.

14. A process of lubricating the molding surfaces of molding machines comprising coating said surfaces with the composition of claim 10.

15. A process of lubricating the molding surfaces of molding machines comprising coating said surfaces with the composition of claim 11.

16. A composition adapted for use as a mold release agent consisting essentially of (1) a polymer of an alpha olefinic hydrocarbon, said polymer having a molecular weight of at least about 1000 and having in the monomer molecule from about 16 to about 34 carbon atoms, (2) an organic diluent having a boiling point of from about −80° C. to about 200° C. and a melting point of below about 25° C.; (3) water; and (4) a surfactant.

17. The composition of claim 16 wherein said olefinic hydrocarbon has from about 18 to about 32 carbon atoms in the monomer molecule.

18. The composition of claim 16 wherein said polymer is polyoctadecene.

19. The process of lubricating the molding surfaces of molding machines comprising coating said surfaces with the composition of claim 16.

20. The process of lubricating the molding surfaces of molding machines comprising coating said surfaces with the composition of claim 18.

References Cited by the Examiner
UNITED STATES PATENTS

| | | | |
|---|---|---|---|
| 2,500,165 | 3/1950 | Doherty et al. | 260—683.1 |
| 2,500,162 | 3/1950 | Seger et al. | 260—683.1 |
| 2,543,016 | 2/1951 | Grosse | 260—677 |
| 2,580,654 | 1/1952 | Browning | 252—15 |
| 3,118,838 | 1/1964 | Scherer | 252—15 |

ALEXANDER H. BRODMERKEL, *Primary Examiner.*

MORRIS LIEBMAN, *Examiner.*

J. B. EVANS, *Assistant Examiner.*